United States Patent
Glass, III et al.

(10) Patent No.: US 6,240,107 B1
(45) Date of Patent: May 29, 2001

(54) SELF-CONFIGURING UNIVERSAL COMMUNICATION DEVICE FOR INTERFACING COMMUNICATION SIGNALS HAVING DIFFERENT PROPERTIES WITH REPEATERLESS TWO-WIRE TELEPHONE LINK

(75) Inventors: James M. Glass, III, Huntsville; Bruce E. Mitchell, Madison; Paul Graves McElroy, Huntsville, all of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/324,872

(22) Filed: Jun. 2, 1999

(51) Int. Cl.[7] .............................. H04J 3/12; H04L 12/28
(52) U.S. Cl. ..................... 370/522; 370/524; 370/254
(58) Field of Search ..................... 370/216, 217, 370/218, 225, 228, 420, 254, 522, 524; 379/93.01, 93.05, 93.06, 93.07

(56) References Cited

U.S. PATENT DOCUMENTS

| 5,598,413 | * | 1/1997 | Sansom et al. | 370/468 |
| 5,629,926 | | 5/1997 | Deutsch et al. | 370/252 |
| 5,636,202 | | 6/1997 | Garney | 370/241 |
| 5,761,293 | | 6/1998 | Newlin | 379/230 |
| 5,793,751 | | 8/1998 | Baker et al. | 370/250 |
| 5,809,033 | * | 9/1998 | Turner et al. | 370/522 |
| 5,831,969 | * | 11/1998 | Bales et al. | 370/225 |
| 5,859,895 | * | 1/1999 | Pomp et al. | 379/29 |
| 5,896,390 | | 4/1999 | Williams | 370/466 |
| 5,943,404 | * | 8/1999 | Sansom et al. | 379/93.06 |
| 6,028,867 | * | 2/2000 | Rawson et al. | 370/463 |
| 6,034,973 | | 3/2000 | Sanderson | 370/524 |

* cited by examiner

Primary Examiner—Ajit Patel
Assistant Examiner—Hanh Nguyen
(74) Attorney, Agent, or Firm—Allen, Dyer Doppelt Milbrath & Gilchrist, P.A.

(57) ABSTRACT

A universal digital communication device includes a first digital communications interface for a first type of digital communication signals (such as basic rate 2B1Q ISDN signals), and a second digital communications interface for a second type of digital communication signals (such as extended range 3B1O ISDN signals) having a digital transport range over a telecommunications network greater than that of the first type of digital communication signals. A processor-controlled multiplexer unit determines which of the two types of digital communication signals is required for providing digital communication connectivity between local and remote communications equipment. It then couples the terminal equipment to the telecommunications network by way the digital communications interface that is capable of interfacing the required digital communication signals with the telecommunication network.

20 Claims, 2 Drawing Sheets

SELF-CONFIGURING UNIVERSAL COMMUNICATION DEVICE FOR INTERFACING COMMUNICATION SIGNALS HAVING DIFFERENT PROPERTIES WITH REPEATERLESS TWO-WIRE TELEPHONE LINK

FIELD OF THE INVENTION

The present invention relates to communication systems, and is especially directed to a new and improved customer premises equipment-associated communication device, that is operative to automatically configure itself to interface a selected one of a plurality of different types of digital communication signals that may be transported over a telecommunication channel, such as, but not limited to a basic range integrated services digital network (ISDN) channel and an extended range ISDN channel. For the case of differential range ISDN channels, the communication device of the invention is operative to determine whether the line to which it is coupled transports a basic rate ISDN channel (typically having a repeaterless two-wire transport range on the order of 15–18 Kft), or whether extended range ISDN service having an extended repeaterless two-wire transport range (e.g., a distance on the order of 25 Kft or greater) is employed. Once this determination is made, the equipment automatically configures itself to interface the identified communication channel type.

BACKGROUND OF THE INVENTION

In order to satisfy ANSI requirements for digital data communications, telephone subscriber copper wire lines have had to comply with specified industry standard performance criteria, that inherently limit the operational range of a two-wire loop. For example, in the case of ISDN basic rate digital subscriber lines (having a data rate of 160 kilobits per second, including bidirectional data payload and overhead maintenance channels), the ANSI standard T1.601 for two-binary/one, quaternary/four level (2B1Q) modulation, two-wire, full-duplex data transport with echo cancellation, requires that the two-wire loop loss of the ISDN channel not exceed 42 dB at 40 KHz, or 1300 ohms, resistive. This loss limitation necessarily constrains the operational range of a 2B1Q ISDN two-wire loop to a range on the order of 15–18 kft, using No. 26 (American Wire Gauge) wire, and commercially available ISDN transceiver interface equipment.

Extending ISDN communications to digital communication equipment at a customer premises that lies geographically beyond this range requires that the service provider either install repeaters, or use a different communication medium, such as a T1 carrier fiber optic link. Unfortunately, each of these proposed solutions to the extended range problem carries with it a substantial cost penalty that the customer is unwilling to bear. The repeater approach is especially costwise egregious, as it requires installation of both an office end repeater powering unit, plus a repeater mounting pole, or a subterranean, environmentally hardened housing (bell jar) for the repeater. Not only does this involve the use of additional equipment (including the cost of the repeater hardware and its installation), but it entails the expense and labor of maintaining the repeater enclosure.

Similarly, although T1 channel banks located in both the switch office and another downstream location (office or remote hut), that is geographically 'close' to the subscriber premises, can accept basic rate interface transmission extender (BRITE) cards for T1 carrier extension, the fact that T1 carrier systems have a capacity for 'multiple' extended basic rate service means that their use to deliver only a single basic rate extended service is prohibitively expensive and impractical.

Advantageously, these problems are solved by the invention described in U.S. Pat. No. 5,809,033 (hereinafter referred to as the '033 patent), issued Sep. 15, 1998 to M. Turner et al, entitled: "Use of Modified Line Encoding and Low Signal-to-Noise Ratio Based Signal Processing to Extend Range of Digital Data Transmission Over Repeaterless Two-Wire Telephone Line," assigned to the assignee of the present application and the disclosure of which is incorporated herein. Pursuant to the invention described in the '033 patent, the range of digital data communication services, such as a basic rate ISDN channel, is 'repeaterlessly' extendable to well beyond the basic rate ISDN two-wire loop range, by a communication mechanism which changes the line code or modulation format, and employs enhanced signal processing techniques, which may be of the type employed in high bit rate digital subscriber line systems, to accommodate a diminished signal-to-noise ratio resulting from the added insertion loss inherent in the extended transport distance of the two-wire pair.

Now although the digital telecommunication range extension scheme described in the '033 patent enables the telecommunication service provider (TELCO) to deliver two different types of digital communication signals (basic range and extended range digital signals) to its customers, from a hardware inventory and delivery standpoint, the TELCO prefers to stock and install only one type of digital communication equipment, and desires that what is installed be the correct equipment for the line of interest. This is particularly true, for example, in the case of ISDN service where the customer premises equipment is located at the outer edge of the basic rate (ISDN) service range.

SUMMARY OF THE INVENTION

In accordance with the present invention, this issue is successfully addressed by a 'universal' digital communication device that supports multiple types of communication signals, such as basic rate ISDN signalling capability and extended range ISDN signalling capability, as non-limiting examples. As will be described, the invention incorporates a line type resolution mechanism that is operative to automatically determine the type of service—e.g., basic rate ISDN channel, or extended range ISDN service. The device then configures itself to interface the identified service type.

For this purpose, the digital communication device of the present invention comprises a plurality of different types of signaling units; for the case of ISDN channels,—a basic rate (2B1Q) ISDN signalling unit, and an extended range (3B1O) ISDN signalling unit, such as that described in the above-referenced '033 patent. This extended range signaling unit contains an encoding and translation operator that achieves a reduction in symbol rate equivalent to transmitting three information or payload bits per symbol (a construct for which may be expressed as or represented by a (three binary, one octal/eight level) line code), instead of the two bits per symbol that are transmitted using 2B1Q line code modulation.

For a 160 kilobits per second ISDN basic rate interface, an initial symbol rate reduction of transmitting three information or payload bits per symbol instead of two bits per symbol means that the same number of information bits can be transmitted at two-thirds the standard symbol rate, or at a symbol rate of 53,333 symbols per second, which has the inherent property of increasing the transmission distance over the two-wire link that will comply with the above-referenced ANSI loss standards.

The basic rate (2B1Q) ISDN signalling unit and the extended range (3B1O) ISDN signalling unit are selectively coupled through a processor-controlled digital terminal equipment (DTE) associated multiplexer unit to digital terminal equipment (DTE) of a customer premises served and to the network. On the network side, the DTE multiplexer unit is coupled to a TELCO interface of the telephone network. On the DTE side of the device, the multiplexer unit is coupled by way of a digital link such as an RS-232 link to customer premises equipment.

The basic rate ISDN signalling unit, which may comprise a commercially available "U"-chip, has a first bidirectional signalling port coupled to a control and data bus interface of the device's control processor. The control processor is operative to interface data in the appropriate format (e.g., RS-232) with the customer premises equipment, and to interface 2B1Q ISDN data with each of the basic rate signalling unit "U"-chip and the extended range ISDN signalling unit. The ISDN "U" chip has a second bidirectional signalling port coupled via an IDL interface to a first network-side, bidirectional signalling port of the DTE multiplexer, which has a processor-coupled bidirectional (2B1Q) data channel port coupled to the control processor.

On its customer premises-associated side, the extended range ISDN signalling unit has a first bidirectional signalling port coupled to the control and data bus interface of the control processor. The extended range signaling unit has a second bidirectional signalling port coupled via an IDL interface to a second network-side, bidirectional signalling port of the DTE multiplexer. On the network side, the extended range signaling unit has transmit and receive signalling ports coupled to an analog interface.

At its network interface end, the analog interface has a first signalling port coupled to a network multiplexer, which is also coupled to a network side transmit port of the basic rate ISDN signaling unit. The network side multiplexer has its output port coupled via an analog transmit circuit to the network. Signals from the network (either basic rate 2B1Q ISDN signals or extended range modified encoding 3B1O ISDN signals) are coupled from the network to a network side receive port of the basic rate ISDN signalling unit and to a network side receive port.

Operation is controlled by a line type identification and configuration routine, which enables the device to automatically determine whether the line is a basic rate ISDN channel, or whether extended range ISDN service is employed. In this line type identification, the control processor configures the data channel transport paths through the multiplexer units to interface the customer premises equipment with the identified channel type.

For this purpose, upon power-up or reset, a basic rate 2B1Q ISDN data transport path is default selected as the signalling path through each of the DTE and network side multiplexers, and the "U"-chip is initialized, so that a basic rate 2B1Q ISDN signalling channel between the customer premises data terminal equipment and the network can be established. If the "U"-chip successfully establishes a connection within a prescribed time-out window, the state that achieved the successful connection is stored. Absent a link failure, no further action is required. However, if the "U"-chip fails to successfully establish a connection with the network within the time-out window, the routine tries the extended range path.

In this attempt, the connectivity routine disables the "U"-chip, switches the connectivity paths of the multiplexers from their default paths to the extended range paths, and initializes the extended range signaling unit. This serves to establish an extended range, modified encoding ISDN signalling channel between the customer premises data terminal equipment and the network. As with the default path, a determination is made as to whether the extended range unit has established a connection with the network within a prescribed time-out window. If so, the that achieved the successful connection is stored. Absent a link failure, no further action is required.

However, if the extended range unit also fails to successfully establish a connection with the network within the time-out window, the processor resets the system to its default state. Should a link failure occur after a connection with the network has been established (for example due to a power failure, removal of a circuit card, etc.), it is determined what was the last state that achieved a successful connection. If extended range, the extended range unit is initialized. If not, the routine is reset.

DETAILED DESCRIPTION

Figure 1:
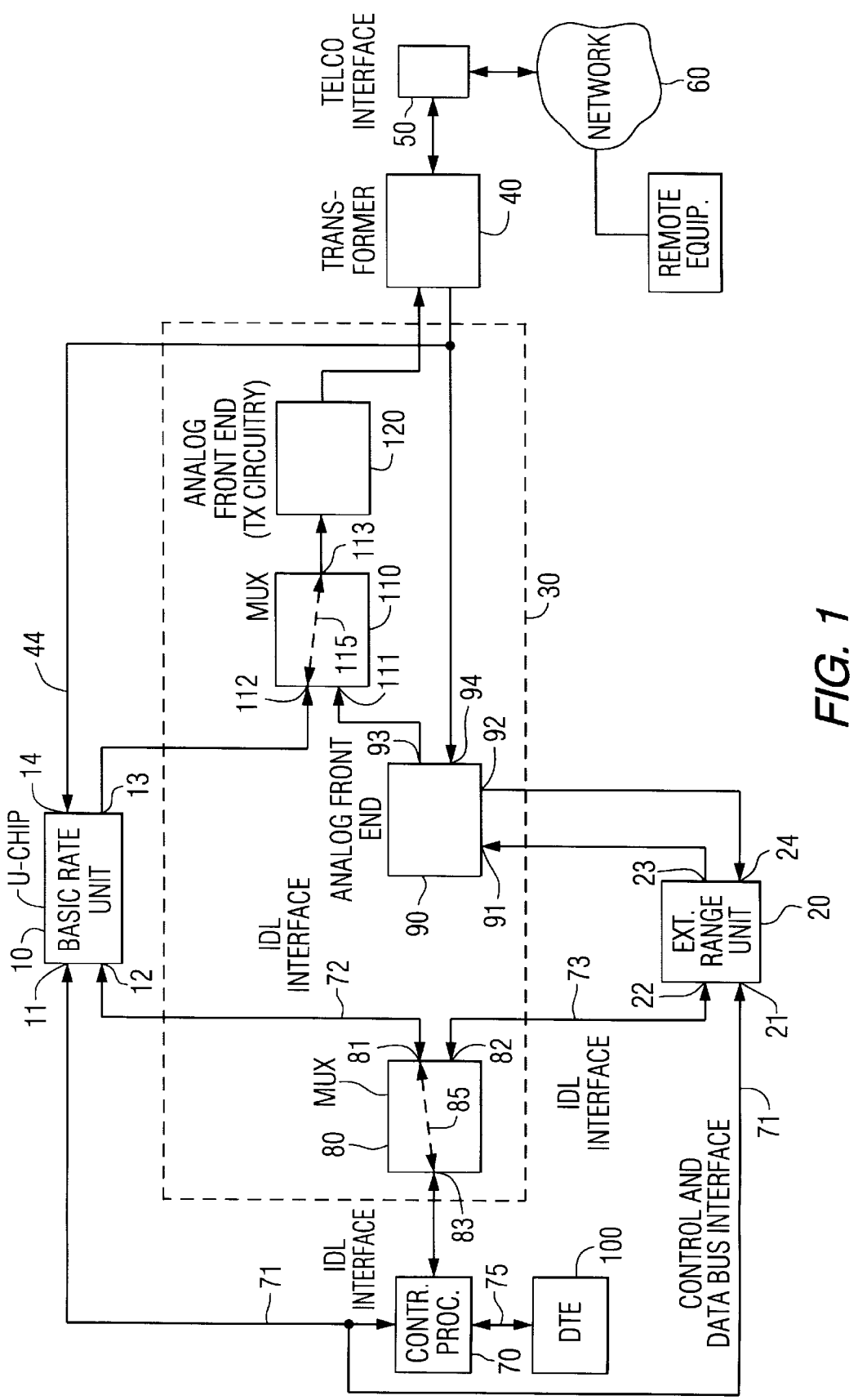
FIG. 1 diagrammatically illustrates a self-configuring digital communication device of the invention.

Before detailing the architecture and operation of the self-configuring communication device of the invention, it should be observed that the invention resides primarily in what is effectively a prescribed set of conventional telecommunication signalling components and attendant supervisory communications microprocessor circuitry therefor, that controls the operations of such components.

Consequently, the configuration of such components and the manner in which they are interfaced with communication equipment of a telephone network have been illustrated in the drawings by a readily understandable block diagram and an associated flow chart, which shows only those specific details that are pertinent to the present invention, so as not to obscure the disclosure with details which will be readily apparent to those skilled in the art having the benefit of the description herein. Thus, the block diagram illustration and self-configuration flow chart are primarily intended to show the major components of the invention and steps executed by the device's control processor in a convenient functional grouping, whereby the present invention may be more readily understood. In terms of a practical implementation of the device hardware, digital ASICs are preferred.

For purposes of presenting an illustrative embodiment, the following description of the digital communication device of the invention will detail interfacing 'ISDN' signals—for either a basic rate range or an extended range application over a two-wire telephone channel. It should be understood, however, that the architecture and signal processing functionality of the present invention may also be readily applied to solving the problem of determining the type of and configuring for the transport of other digital communication signals, such as but not limited to DDS and HDSL channels.

Regardless of the communication environment, the invention preferably takes advantage of the availability of application specific integrated circuit manufacturing processes to design and implement integrated circuit-based signal processing components, especially high speed digital ASICs, so as to enable the practical realization of a reasonably priced architecture. In the environment of a basic rate ISDN channel, since the transceiver circuits operate at a symbol rate considerably lower than the high speed data processing capacity of the digital ASICs, the overall cost of incorporating the enhanced encoding and noise reduction techniques of the invention described in the '033 patent into such a lower symbol rate transceiver is far less than that required to implement either of the conventional range extension approaches, described above, such as that involving the installation of a repeater.

Referring now to FIG. 1, the new and improved self-configuring digital communication device of the invention is diagrammatically illustrated as comprising a plurality of different types of signaling units—a basic rate ISDN signalling unit 10, and an extended range ISDN signalling unit 20—which are arranged to be selectively coupled through a processor-controlled multiplexer unit (mux) 30 to digital terminal equipment (DTE) of a customer premises served and to the network.

For this purpose, on the network side, the multiplexer unit 30 is coupled via a line-coupling transformer 40 to a TELCO interface 50 of a telephone network 60. On the DTE side, the multiplexer unit 30 is coupled by way of a digital link 75, such as but not limited to an RS-232 link, to customer premises (data terminal) equipment 100. The basic rate ISDN signalling unit 10 may comprise a commercially available "U"-chip, such as but not limited to a Motorola 145572 "U"-chip.

On its customer premises-associated processor-side, the ISDN "U" chip 10 has a first bidirectional signalling port 11 coupled to a control and data bus interface 71 of the control processor 70, which is operative to interface data in the appropriate format (e.g., RS-232) with the customer premises equipment, on the one hand, and to interface 2B1Q ISDN data with each of the basic rate signalling unit "U"-chip 10 and the extended range ISDN signalling unit 20. For this purpose, control processor 70 may comprise a Motorola 68302 IMP processor chip, as a non-limiting example.

The ISDN "U" chip 10 has a second bidirectional signalling port 12 that is coupled via an interface 72 (such as an IDL interface, as a non-limiting example) to a first network-side, bidirectional signalling port 81 of a first, DTE multiplexer 80. Multiplexer 80 has a processor-coupled bidirectional (2B1Q) data channel port 83 coupled by way of an IDL interface 74 to the control processor 70.

It is through the IDL interface 74 that the control processor 70 interfaces (2B1Q-formatted ISDN) data received from either unit 10 or unit 20 intended for delivery to the customer premises equipment 100, and through which the processor supplies (2B1Q-formatted ISDN) customer-sourced (RS-232) data to be transmitted via either unit 10 or unit 20 for delivery to the network.

On its customer premises-associated side, the extended range ISDN signalling unit 20 has a first bidirectional signalling port 21 coupled to the control and data bus interface 73 of the control processor 70. As described above, the architecture of the extended range ISDN signalling unit 20 may correspond to that of the range-extending telephone wireline transceiver architecture described in the above-referenced '033 patent. As described in the '033 patent, and reviewed briefly above, this extended range ISDN signaling architecture changes the line code or modulation format, and employs enhanced signal processing techniques of the type employed in high bit rate digital subscriber line systems, in order to accommodate a diminished signal-to-noise ratio resulting from the added insertion loss inherent in the extended transport distance (of ISDN signals) over the two-wire pair.

In particular, the extended range signaling unit 20 contains an encoding and translation operator that achieves a reduction in symbol rate equivalent to transmitting three information or payload bits per symbol (a construct for which may be expressed as or represented by a (three binary, one octal/eight level) line code), instead of the two bits per symbol that are transmitted using 2B1Q line code modulation. For a 160 kilobits per second ISDN basic rate interface, this initial symbol rate reduction of transmitting three information or payload bits per symbol instead of two bits per symbol means that the same number of information bits can be transmitted at two-thirds the standard symbol rate, or at a symbol rate of 53,333 symbols per second, which has the inherent property of increasing the transmission distance over the two-wire link that will comply with the above-referenced ANSI loss standards.

The extended range signaling unit 20 has a second bidirectional signalling port 22 coupled via an IDL interface 73 to a second network-side, bidirectional signalling port 82 of multiplexer 80. On its network side, extended range signaling unit 20 has a transmit signalling port 23 coupled to a first port 91, and a receive signaling port 24 coupled to a second port 92 of an analog (front end) interface 90, such as that in the transceiver architecture of the '033 patent.

At its network interface end, the analog interface 90 has a first signalling port 93 coupled to a first input port 111 of a network multiplexer 110, a second input port 112 of which is coupled to a network side transmit port 13 of the ISDN signaling unit 10. The multiplexer 110 has an output port 113 coupled to a standard analog transmit circuit 120, the output of which is interfaced with the network by way of the line-coupling transformer 40. Signals received from the network (either basic rate 2B1Q ISDN signals or extended range modified encoding ISDN signals) are coupled from transformer via link 44 to a network side receive port 14 of the basic rate ISDN signalling unit 10, and to a network side receive port 94 of the analog interface 90.

Figure 2:
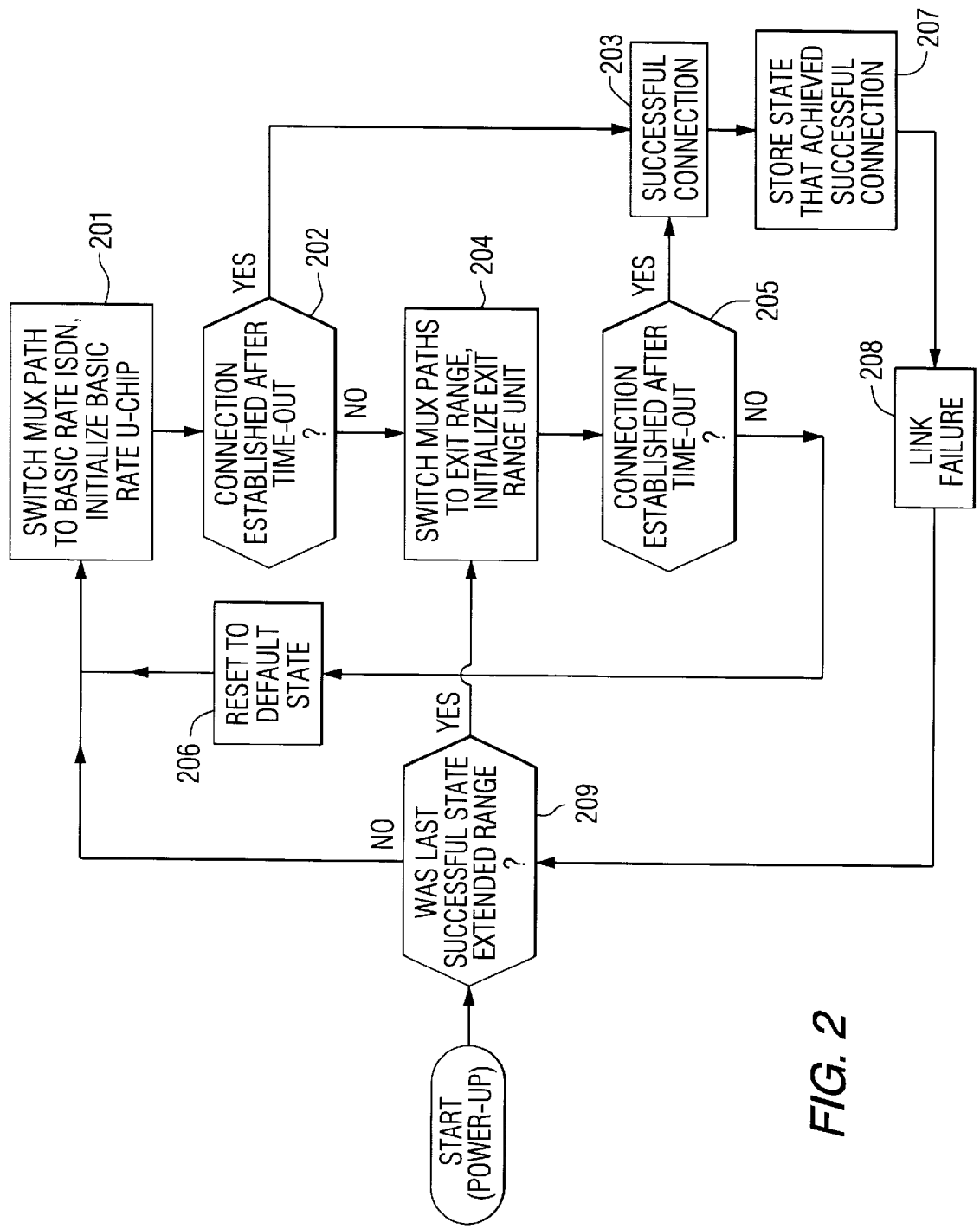
FIG. 2 is a flow chart of a link type identification and connection routine that is executed by the control processor of the device of FIG. 1 to automatically configure itself for the range of ISDN service required.

Operation of FIG. 1 may be understood with reference to the flow chart of FIG. 2, which shows the steps of a link type identification and connection routine that is executed by the control processor 70 when device is placed in service. As will be described, this routine automatically determines whether the line transports basic rate ISDN channel, or whether extended range ISDN service is employed. In the course of making this identification, the control processor configures the data channel transport paths through the multiplexer unit 30 to interface the customer premises equipment with the identified channel type.

For this purpose, as shown by the respective connectivity arrows 85 and 115 in the block diagram of FIG. 1, whenever the unit is powered up or reset, a 'default' signal transport path through each of multiplexers 80 and 110 provides a basic rate 2B1Q ISDN data channel path through the "U"-chip 10. Although the illustrated default path is that of providing a basic rate 2B1Q ISDN data channel, it should be realized that the default path could alternatively be through the extended range signalling unit 20. The choice of providing the default path through the basic rate "U" chip unit 10 in the present example is to accommodate the probability that the installation of interest will be within the range of normal (non-extended range) communications with the network, and therefore be interfaced with a line transporting a basic rate 2B1Q ISDN channel, rather than a modified encoding extended range channel. Should there be a greater probability that the installation of interest will be beyond the range of normal ISDN communications with the network, and therefore be interfaced with a line transporting a modified encoding, extended range channel, rather than a basic rate 2B1Q ISDN channel, the multiplexers' default paths may be provided through the extended range signaling unit 20. Prior to activation, both signalling units 10 and 20 are in a powered-down state.

For the present example of having the default signaling channel through the 2B1Q ISDN unit 10, at step 201 of the routine of FIG. 2, the "U"-chip 10 is initialized, so that a basic rate 2B1Q ISDN transmit signalling channel between the customer premises data terminal equipment 100 and the network 60 is established as follows: RS-232 link 75—processor 70—mux 80—"U"-chip 10—mux 110—transmit circuit 120—transformer 40—TELCO interface 50. Conversely, on the receive side from the network, a basic rate 2B1Q ISDN receive signalling channel is established between the network 60 and the customer premises data terminal equipment 100 as follows: TELCO interface 50—transformer 40—"U"-chip 10—mux 80—processor 70—RS-232 link 75.

Once the basic rate ISDN default link has been through the "U"-chip 10 has been initialized, the routine proceeds to determine in query step 202 whether or not the "U"-chip 10 has successfully established a connection with the network within a prescribed time-out window (e.g., some N number of seconds, such as 30–60 seconds, as a non-limiting example). If the answer to query step 202 is YES (the "U"-chip 10 has successfully established a basic rate ISDN transport connection with the network within the time-out window), it is inferred in step 203 that a successful connection between the customer premises equipment and the network has been established. The state that achieved the successful connection is then stored in step 207. Absent a link failure, shown at 208, no further action is required.

If the answer to query step 202 is NO (the "U"-chip 10 has failed to successfully establish a connection with the network within the time-out window), the routine steps to step 204. In step 204, the processor disables the "U"-chip 10, switches the connectivity paths of multiplexers 80 and 110 from their default paths to the extended range paths, and initializes the extended range signaling unit 20. This results in an extended range, modified encoding ISDN transmit signalling channel being established between the customer premises data terminal equipment 100 and the network 60 to be established as follows: RS-232 link 75—processor 70—mux 80—extended range unit 20—analog unit 90—mux 110—transmit circuit 120—transformer 40—TELCO interface 50. On the receive side from the network, an extended range modified encoding ISDN signalling channel is established between the network 60 and the customer premises data terminal equipment 100 as follows: TELCO interface 50—transformer 40—analog unit 90—extended range unit 20—mux 80—processor 70—RS-232 link 75.

As in the case with the default path, the control processor 70 next determines in query step 205 whether the extended range unit 20 has successfully established a connection with the network within a prescribed time-out window (which may be (but is not necessarily) the same time-out window employed in step 202). If the answer to query step 205 is YES, a successful connection is inferred in step 203 and state that achieved the successful connection is stored in step 207, as described above.

However, if the answer to query step 205 is NO (implying that the extended range unit 20 has also failed to successfully establish a connection with the network within the time-out window), the routine transitions to step 206, wherein the processor 70 resets the system to its default state. For the present example, this involves disabling the extended range unit 20, re-enabling the "U"-chip 10, and switching back the connectivity paths of multiplexers 80 and 110 from the extended range paths to the default paths through the "U"-chip 10. The routine then transitions back to step 201 to reinitialize the "U"-chip 10, and restart the routine described above.

Should a link failure occur after a connection with the network has been established (for example due to a power failure, removal of a circuit card, etc.), as shown at link failure state 208, a query step 209 is executed. In query step 209 it is determined what state was stored in step 207. If the last state that achieved a successful connection was extended range (the answer to query step 209 is YES), the routine transitions to step 204. If not (the answer to query step 209 is NO), the routine returns to step 201.

As will be appreciated from the foregoing description, the desire of TELCOs to stock and install only one type of customer premises equipment (e.g., one type of ISDN communication device), regardless of whether the installation site is within basic rate signaling range or requires extended range signaling, is readily satisfied by the 'universal' device of the present invention, which contains both basic rate ISDN signalling capability and extended range ISDN signalling capability, and incorporates a line type resolution mechanism, that automatically configures itself for the range of ISDN service required.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method for automatically enabling digital terminal equipment to conduct digital communications via the same communication path with a telecommunications network comprising the steps of:

(a) providing a plurality of different types of digital communications interfaces that are controllably operative to interface different types of digital communication signals over said same communication path with said telecommunications network; and (b) automatically determining which of said different types of digital communication signals is required for providing digital communication connectivity between said digital terminal equipment over said same communication path with said telecommunications network between said digital terminal equipment and remote communications equipment, and automatically coupling said digital terminal equipment over said same communication path with said telecommunications network by way of a selected one of said different types of digital communications interfaces that has been automatically determined to be capable of interfacing said required digital communication signals over said same communication path with said telecommunication network.

2. A method according claim 1, wherein step (b) comprises
(b1) automatically coupling said digital terminal equipment to said same communication path with said telecommunications network by automatically coupling a first digital communications interface to said same communication path and automatically attempting to establish digital telecommunication connectivity over said same communication path with said telecommunications network using a first type of digital communication signals, and
(b2) in response to establishing digital telecommunication connectivity over said same communication path with said telecommunication network in step (b1), conducting digital communications with said remote communications equipment over said same communication path with said telecommunications network using said first type of digital communication signals, but, in response to failing to establish telecommunication connectivity in step (b1), automatically coupling said digital terminal equipment to said same communication path with said telecommunications network by automatically coupling a second digital communications interface with said same communication path and initiating digital telecommunication connectivity over said same communication path with said telecommunications network with said remote communications equipment using a second type of digital communication signals.

3. A method according to claim 2, further including step (c): in response to failing to automatically establish digital telecommunication connectivity in step (b2), automatically repeating step (b1), and step (b2) as necessary, so as to automatically establish digital telecommunication connectivity over said common communication path with said telecommunications network with said remote communications equipment.

4. A method according to claim 2, wherein a first type of digital communications signals have an encoding format that is capable of providing digital communication connectivity over a first digital communication transport distance, and wherein a second type of digital communications signals have an encoding format that is capable of providing digital communication connectivity over a second digital communication transport distance, in excess of said first digital communication transport distance.

5. A method according to claim 4, wherein said first type of digital communication signals comprise 2B1Q ISDN communication signals, and wherein said second type of digital communication signals comprise modified encoding ISDN signals capable of providing extended range ISDN communication connectivity over said telecommunication network.

6. A method according to claim 5, wherein said second type of digital communication signals comprise 3B1O ISDN signals.

7. A method according to claim 2, further including step (c): in response to a loss of digital telecommunication connectivity that has been established in step (b1) or step (b2), automatically repeating steps repeating step (b1), and step (b2) as necessary, so as to automatically re-establish digital telecommunication connectivity over said same communication path with said telecommunications network.

8. A method of automatically enabling digital terminal equipment to conduct digital communications with remote communications equipment by way of a common communication path with a telecommunications network, said method comprising the steps of:

(a) automatically attempting to establish telecommunication connectivity over said common communication path with said telecommunications network by coupling a first digital communication interface that employs a selected one type of a plurality of different types of digital communication signals having respectively different digital communication properties to said common communication path;

(b) in response to step (a) establishing telecommunication connectivity with said telecommunications network over said common communication path using said selected one type of digital communication signals, conducting digital communications via said common communication path with said telecommunications network by way of said first digital communication interface using said first type of digital communication signals, but, in response to failing to establish telecommunication connectivity in step (a), automatically coupling said digital terminal equipment over said common communication path with said telecommunication network by automatically coupling a second digital communications interface to said common communication path and initiating telecommunication connectivity with said network by way of said second digital communications interface using a selected second of said plurality of different types of digital communication signals.

9. A method according to claim 8, wherein said digital terminal equipment comprises customer premises digital terminal equipment, and said remote communications equipment comprises a central office switch.

10. A method according to claim 8, wherein said first type of digital communication signals correspond to 2B1Q ISDN communication signals, and wherein said second type of digital communication signals correspond to modified encoding ISDN signals capable of providing extended range ISDN communication connectivity over said common communication path with said telecommunication network.

11. A method according to claim 10, wherein said second type of digital communication signals correspond to 3B1O ISDN signals.

12. A method according to claim 8, further including step (c): in response to failing to establish digital telecommunication connectivity in step (b), automatically repeating step (a), and step (b) as necessary, to automatically establish digital telecommunication connectivity over said common communication path with said remote communications equipment via said network.

13. A method according to claim 8, further including step (c): in response to a loss of digital telecommunication connectivity that has been established in step (a) or step (b), automatically repeating steps repeating step (a), and step (b) as necessary, to re-establish digital telecommunication connectivity over said common communication path with said remote communications equipment via said network.

14. A communication device for providing digital communication connectivity over a common communication path with a telecommunications network between digital terminal equipment and remote communication equipment comprising:
a plurality of different digital communication interfaces that are controllably operative to interface respective different types of digital communication signals with said common communication path with said telecommunications network; and
a digital communication interface multiplexer unit which is controllably operative to automatically determine which of said different types of digital communication signals is required to provide digital communication connectivity between said digital terminal equipment over said common communication path with said telecommunications network between said digital terminal equipment and said remote communication equipment, and to automatically couple said digital terminal equipment to said common communication path with said telecommunications network by way of a selected one of said digital communication interfaces that is capable of interfacing said required digital communication signals with said common communication path with said telecommunications network.

15. A communication device according to claim 14, wherein said digital communication interface multiplexer unit is operative to automatically cause said selected one digital communication interface to attempt to establish digital communication connectivity with said common communication path with said telecommunications network and, in response to establishing digital communication connectivity with said common communication path with said telecommunications network, to conduct digital communications with said remote communication equipment via said common communication path with said telecommunications network using said selected one digital communication interface but, in response to failing to establish communication connectivity, to automatically couple said digital terminal equipment to said common communication path with said network by way of a second digital communication interface and initiating digital communication connectivity with said common communication path with said network using said second digital communication interface.

16. A communication device according to claim 15, wherein a first type of digital communication signals of said first digital communication interface have a digital communication transport range different than that of a second type of digital communication signals of said second digital communication interface.

17. A communication device according to claim 15, wherein said first type of digital communication signals comprise 2B1Q ISDN communication signals, and wherein said second type of digital communication signals comprise modified encoding ISDN signals capable of providing extended range ISDN communication connectivity over said common communication path with said telecommunications network.

18. A communication device according to claim 17, wherein said second type of digital communication signals correspond to 3B1O ISDN signals.

19. A communication device according to claim 15, wherein said digital communications interface multiplexer unit is operative, in response to failing to establish digital telecommunication connectivity by way of said second digital communications interface, to again automatically attempt to establish digital telecommunication connectivity with said remote device via said common communication path with said network by way of said selected one digital communications interface.

20. A communication device according to claim 14, wherein said digital communications interface multiplexer unit is operative, in response to a loss of digital telecommunication connectivity over said common communication path with said telecommunications network, to again automatically attempt to establish digital telecommunication connectivity with said remote device via said common communication path with said telecommunications network by way of said selected one digital communications interface.

* * * * *

UNITED STATES PATENT AND TRADEMARK OFFICE
CERTIFICATE OF CORRECTION

PATENT NO. : 6,240,107 B1  Page 1 of 2
DATED : May 29, 2001
INVENTOR(S) : James M. Glass, III, Bruce E. Mitchell, Paul Graves McElroy It is certified that error appears in the above-identified patent and that said Letters Patent is hereby corrected as shown below:

Title page,
Item [57], ABSTRACT, line 14, insert -- of -- between "way" and "the"

Drawings,
Fig. 2, delete "FIG. 2" insert -- new FIG. 2 --

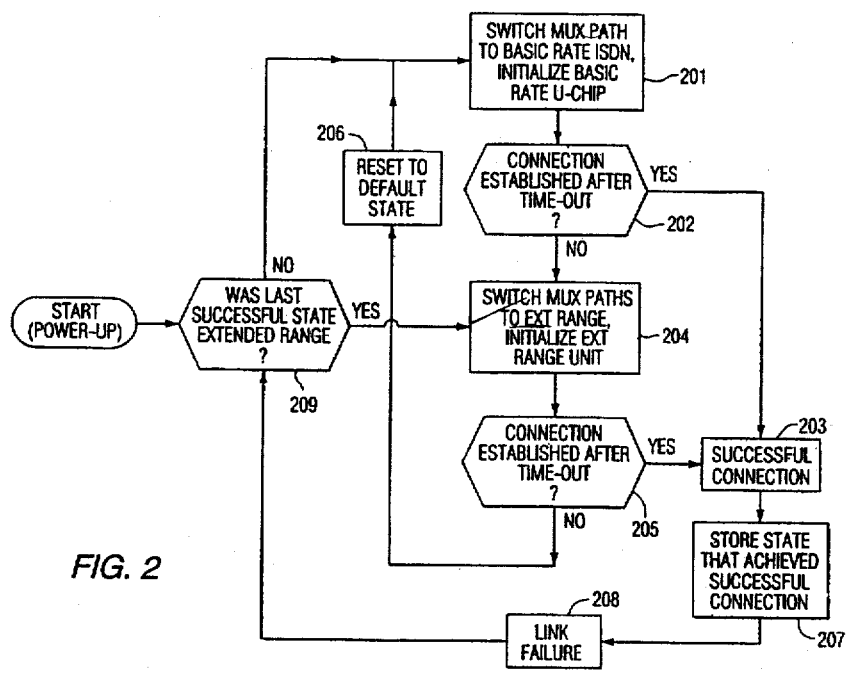

Column 4,
Line 8, delete "the that" insert -- the state that --

Column 7,
Line 27, delete "link has been through" insert -- link through --

Column 9,
Line 59, delete "repeating steps repeating step (b1)" insert -- repeating steps (b1) --

UNITED STATES PATENT AND TRADEMARK OFFICE
CERTIFICATE OF CORRECTION

PATENT NO. : 6,240,107 B1
DATED : May 29, 2001
INVENTOR(S) : James M. Glass, III, Bruce E. Mitchell, Paul Graves McElroy It is certified that error appears in the above-identified patent and that said Letters Patent is hereby corrected as shown below:

<u>Column 10,</u>
Line 52, delete "repeating steps repeating step (a)" insert -- repeating steps (a) --

Signed and Sealed this

Twenty-second Day of January, 2002

Attest:

Attesting Officer

JAMES E. ROGAN
*Director of the United States Patent and Trademark Office*